United States Patent
Barr et al.

(10) Patent No.: US 6,863,361 B2
(45) Date of Patent: Mar. 8, 2005

(54) METHOD TO CORRECT FOR MALFUNCTIONING INK EJECTION ELEMENTS IN A SINGLE PASS PRINT MODE

(75) Inventors: Jeffrey H. Barr, San Diego, CA (US); Jennifer Korngiebel, San Diego, CA (US); Tod S. Heiles, Vancouver, WA (US); Steven L. Webb, Murrieta, CA (US); Jeffrey D Rutland, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/001,590

(22) Filed: Oct. 30, 2001

(65) Prior Publication Data
US 2004/0223014 A1 Nov. 11, 2004

(51) Int. Cl.$^7$ ............................................. B41J 29/393
(52) U.S. Cl. ............................. 347/19; 347/40; 347/41
(58) Field of Search ............................... 347/16, 19, 9, 347/40, 41, 43

(56) References Cited

U.S. PATENT DOCUMENTS

| | | | |
|---|---|---|---|
| 6,347,855 B1 * | 2/2002 | Takanaka | 347/19 |
| 6,520,623 B2 * | 2/2003 | Miyake et al. | 347/40 |
| 2001/0028371 A1 | 10/2001 | Su et al. | |
| 2002/0021325 A1 * | 2/2002 | Koitabashi et al. | 347/43 |

FOREIGN PATENT DOCUMENTS

| | | |
|---|---|---|
| EP | 0863004 A2 | 9/1998 |
| EP | 1033251 A1 | 9/2000 |
| EP | 1084847 A2 | 3/2001 |
| EP | 1147910 | 10/2001 |

* cited by examiner

*Primary Examiner*—Stephen D. Meier
*Assistant Examiner*—Lam S Nguyen (57) ABSTRACT

Described is a method which corrects for malfunctioning or inoperable ink ejection elements in a one-pass printmode. The method comprises obtaining the standard printmask; identifying the ink ejection elements which are malfunctioning; ascertaining ink ejection elements adjacent to the ejection elements which are malfunctioning; selecting particular adjacent ink ejection elements from the adjacent ink ejection elements; and modifying the standard printmask by adjusting the amount of ink deposited by the selected adjacent ink ejection elements to create a modified printmask.

21 Claims, 6 Drawing Sheets

FIG. 6

METHOD TO CORRECT FOR MALFUNCTIONING INK EJECTION ELEMENTS IN A SINGLE PASS PRINT MODE

FIELD OF THE INVENTION

This invention relates to inkjet printers and, more particularly, to an inkjet printer which corrects for malfunctioning or inoperable ink ejection elements.

BACKGROUND OF THE INVENTION

Thermal inkjet hardcopy devices such as printers, graphics plotters, facsimile machines and copiers have gained wide acceptance. These hardcopy devices are described by W. J. Lloyd and H. T. Taub in "Ink Jet Devices," Chapter 13 of *Output Hardcopy Devices* (Ed. R. C. Durbeck and S. Sherr, San Diego: Academic Press, 1988). The basics of this technology are further disclosed in various articles in several editions of the *Hewlett-Packard Journal* [Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No.1 (February 1994)], incorporated herein by reference. Inkjet hardcopy devices produce high quality print, are compact and portable, and print quickly and quietly because only ink strikes the paper.

An inkjet printer forms a printed image by printing a pattern of individual dots at particular locations of an array defined for the printing medium. The locations are conveniently visualized as being small dots in a rectilinear array. The locations are sometimes "dot locations", "dot positions", or pixels". Thus, the printing operation can be viewed as the filling of a pattern of dot locations with dots of ink.

Inkjet hardcopy devices print dots by ejecting very small drops of ink onto the print medium and typically include a movable carriage that supports one or more printheads each having ink ejecting ink ejection elements. The carriage traverses over the surface of the print medium, and the ink ejection elements are controlled to eject drops of ink at appropriate times pursuant to command of a microcomputer or other controller, wherein the timing of the application of the ink drops is intended to correspond to the pattern of pixels of the image being printed.

The typical inkjet printhead (i.e., the silicon substrate, structures built on the substrate, and connections to the substrate) uses liquid ink (i.e., dissolved colorants or pigments dispersed in a solvent). It has an array of precisely formed orifices or nozzles attached to a printhead substrate that incorporates an array of ink ejection chambers which receive liquid ink from the ink reservoir. Each chamber is located opposite the nozzle so ink can collect between it and the nozzle and has a firing resistor located in the chamber. The ejection of ink droplets is typically under the control of a microprocessor, the signals of which are conveyed by electrical traces to the resistor elements. When electric printing pulses heat the inkjet firing chamber resistor, a small portion of the ink next to it vaporizes and ejects a drop of ink from the printhead. Properly arranged nozzles form a dot matrix pattern. Properly sequencing the operation of each nozzle causes characters or images to be printed upon the paper as the printhead moves past the paper.

In an inkjet printhead the ink is fed from an ink reservoir integral to the printhead or an "off-axis" ink reservoir which feeds ink to the printhead via tubes connecting the printhead and reservoir. Ink is then fed to the various vaporization chambers either through an elongated hole formed in the center of the bottom of the substrate, "center feed", or around the outer edges of the substrate, "edge feed."

The ink cartridge containing the ink ejection elements is moved repeatedly across the width of the medium to be printed upon. At each of a designated number of increments of this movement across the medium, each of the resistors is caused either to eject ink or to refrain from ejecting ink according to the program output of the controlling microprocessor. Each completed movement across the medium can print a swath approximately as high as the number of ink ejection elements arranged in a column of the ink cartridge multiplied times the distance between nozzle centers. After each such completed movement or swath the medium is moved forward the height of the swath or a fraction thereof, and the ink cartridge begins the next swath. By proper selection and timing of the signals, the desired print is obtained on the medium.

The print quality produced from an inkjet device is dependent upon the reliability of its ink ejection elements. A multi-pass print mode can partially mitigate the impact of the malfunctioning ink ejection elements on the print quality by substituting functioning ink ejection elements for malfunctioning ink ejection elements. This is possible in a multi-pass printmode because more than one ink ejection element traverses each horizontal print position, or row, on the media. For example, in a two-pass printmode two ink ejection elements pass over each horizontal print position on the media and in a four-pass printmode four ink ejection elements pass over each horizontal print position on the media. Thus, in a two-pass printmode one other functioning ink ejection element may be substituted for a malfunctioning ink ejection element and in a four-pass printmode three other ink ejection elements may be substituted for a malfunctioning ink ejection element. However, use of multi-pass printmodes significantly reduce printer throughput.

However, when printing in a one-pass printmode the ability to hide a malfunctioning ink ejection element with a different ink ejection element is not possible because all pixels in a horizontal row are always printed with the same ink ejection element. If this malfunctioning ink ejection element is out there is no way to hide the malfunctioning ink ejection element with error hiding techniques that depend on multiple passes. Accordingly, a method is needed which corrects for malfunctioning, or inoperable, ink ejection elements in a one-pass printmode.

SUMMARY OF THE INVENTION

The present invention provides a method which corrects for malfunctioning or inoperable ink ejection elements in a one-pass printmode. The method comprises obtaining the standard printmask; identifying the ink ejection elements which are malfunctioning; ascertaining ink ejection elements adjacent to the ejection elements which are malfunctioning; selecting particular adjacent ink ejection elements from the adjacent ink ejection elements; and modifying the standard printmask by adjusting the amount of ink deposited by the selected adjacent ink ejection elements to create a modified printmask.

DETAILED DESCRIPTION OF A PREFERRED EMBODIMENT

While the present invention will be described below in the context of an off-axis printer having an external ink source, it should be apparent that the present invention is also useful in an inkjet printer which uses inkjet print cartridges having an ink reservoir integral with the print cartridge.

Figure 1:
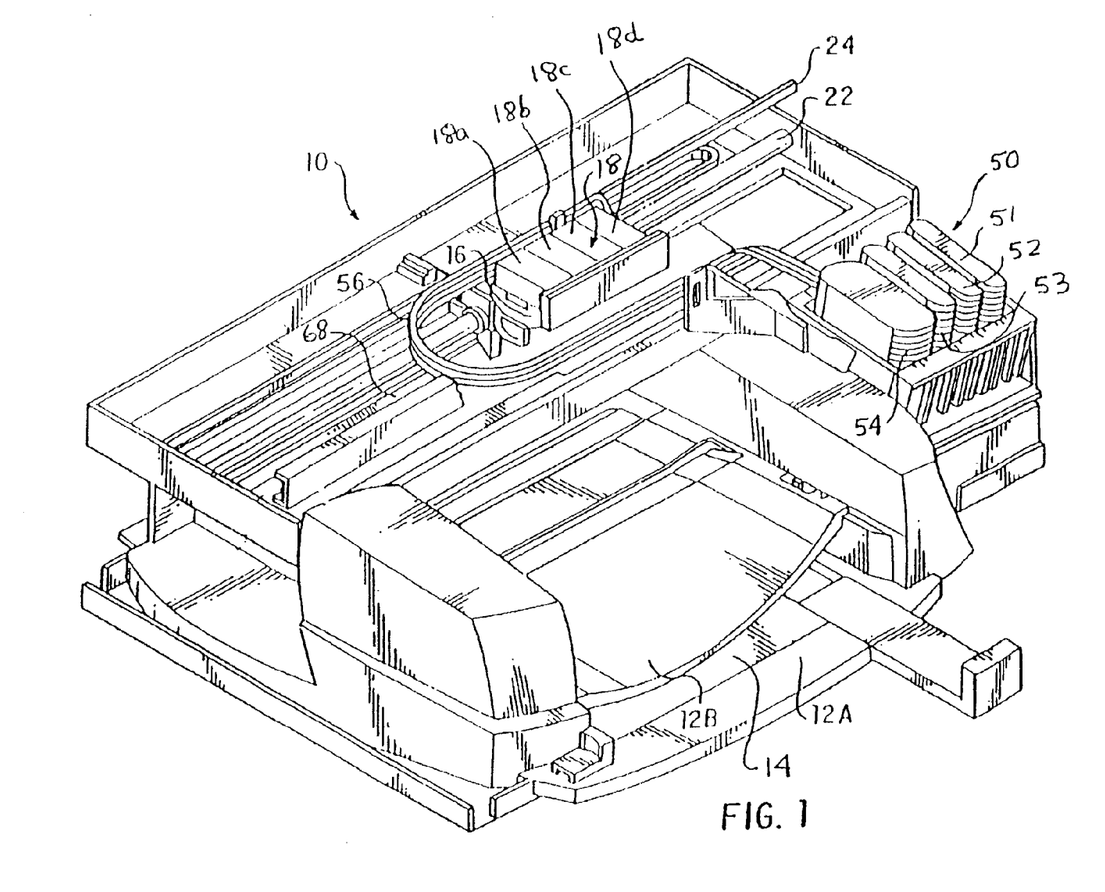
FIG. 1 is a perspective view of one embodiment of an inkjet printer incorporating the present invention.

FIG. 1 is a perspective view of one embodiment of an inkjet printer 10 suitable for utilizing the present invention, with its cover removed. Generally, printer 10 includes a tray 12 for holding media 14. When a printing operation is initiated, a sheet of media 14 from tray 12A is fed into printer 10 using a sheet feeder, then brought around in a U direction to now travel in the opposite direction toward tray 12B. A carriage unit 16 supports and carries a set of removably mounted print cartridges 18. The carriage 16 is supported from below on a slide rod 22 that permits the carriage 16 to move under the directing force of a carriage mechanism. The media is stopped in a print zone 68 and the scanning carriage 16 is scanned across the media 14 for printing a swath of ink thereon. The printing may occur while the carriage is scanning in either directional. This is referred to as bi-directional printing. After a single scan or multiple scans, the media 14 is then incrementally shifted using a conventional stepper motor and feed rollers to a next position within the print zone 68 and carriage 16 again scans across the media 14 for printing a next swath of ink. When the printing on the media is complete, the media is forwarded to a position above tray 12B, held in that position to ensure the ink is dry, and then released.

The carriage scanning mechanism may be conventional and generally includes a slide rod 22, along which carriage 16 slides, a flexible circuit (not shown in FIG. 1) for transmitting electrical signals from the printer's microprocessor to the carriage 16 and print cartridges 18 and a coded strip 24 which is optically detected by a photo detector in carriage 16 for precisely positioning carriage 16. A stepper motor (not shown), connected to carriage 16 using a conventional drive belt and pulley arrangement, is used for transporting carriage 16 across the print zone 68.

The features of inkjet printer 10 include an ink delivery system for providing ink to the print cartridges 18 and ultimately to the ink ejection chambers in the printheads from an off-axis ink supply station 50 containing replaceable ink supply cartridges 51, 52, 53, and 54, which may be pressurized or at atmospheric pressure. For color printers, there will typically be a separate ink supply cartridge for black ink, yellow ink, magenta ink, and cyan ink. Four tubes 56 carry ink from the four replaceable ink supply cartridges 51–54 to the print cartridges 18.

The carriage 16 holds a set of ink cartridges 18 that incorporate a black print cartridge 18a, and a set of color ink print cartridges 18b–18d for the colors of cyan, magenta, and yellow, respectively. The print cartridges each incorporate a black ink printhead 79a, and a set of color ink printheads 79b–79d for the colors of cyan, magenta, and yellow, respectively. Each of the printheads may be like printhead 79 shown in FIG. 2. Each of the printheads 79a–79d includes a plurality of inkjet nozzles 82 for ejecting the ink droplets that form the textual and object images in a given page of information.

In operation, the printer 10 responds to commands by printing full color or black print images on the print medium 14 which is mechanically retrieved from the feed tray 12 A. The printer 10 operates in a multi-pass print mode to cause one or more swaths of ink droplets to be ejected onto the printing medium 14 to form a desired image. Each swath is formed in a pattern of individual dots that are deposited at particular pixel locations in an N by M array defined for the printing medium. The pixel locations are conveniently visualized as being small ink droplet receiving areas grouped in a matrix array.

Figure 2:
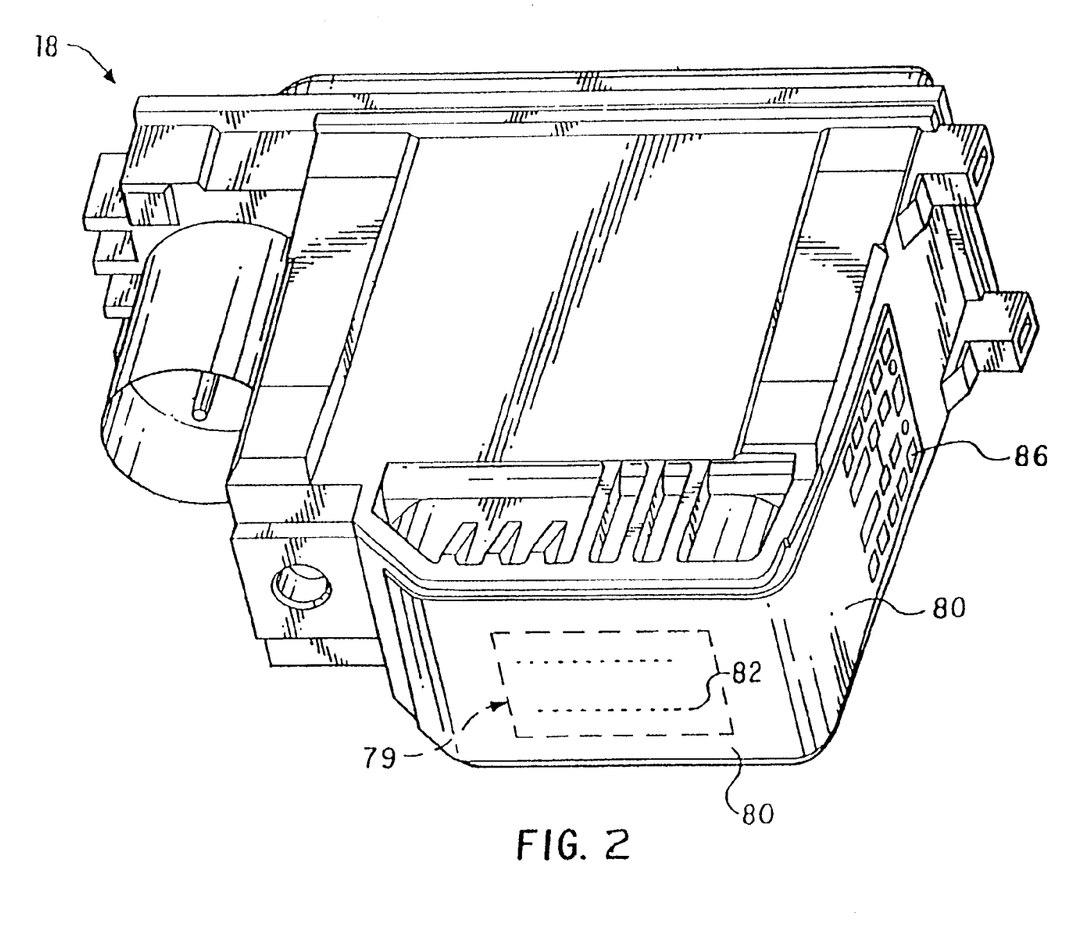
FIG. 2 is a bottom perspective view a single print cartridge.

Referring to FIG. 2, a flexible circuit 80 containing contact pads 86 is secured to print cartridge 18. Contact pads 86 align with and electrically contact printer electrodes on carriage 16 (not shown) when print cartridge 18 is installed in printer 10 to transfer externally generated energization signals to printhead assembly 79. Flexible circuit 80 has a nozzle array consisting of two rows of nozzles 82 which are laser ablated through flexible circuit 80. Mounted on the back surface of flexible circuit 80 is a silicon substrate (not shown). The substrate includes a plurality of ink ejection chambers with individually energizable ink ejection elements therein, each of which is located generally behind a single orifice or nozzle 82. The ink ejection elements may be either thermal resistors or piezoelectric elements. For a description of the substrate and the ejection elements, see U.S. Pat. No. 6,193,347, entitled "Hybrid Multi-drop/Multi-pass Printing System," which is herein incorporated by reference. The substrate includes a barrier layer which defines the geometry of the ink ejection chambers and ink channels formed therein. The ink channels are in fluidic communication ink ejection chambers and with an ink reservoir. The back surface of flexible circuit 80 includes conductive traces formed thereon. These conductive traces terminate in contact pads 86 on a front surface of flexible circuit 80. The other ends of the conductive traces are bonded to electrodes on the substrate.

Further details on printhead design and electronic control of inkjet printheads are described in U.S. patent application Ser. No. 09/240,177, filed Jan. 30, 1999, entitled "Ink Ejection Element Firing Order to Minimize Horizontal Banding and the Jaggedness of Vertical Lines;" U.S. patent application Ser. No. 09/016,478, filed Jan. 30, 1998, entitled "Hybrid Multi-Drop/Multi-Pass Printing System;" U.S. patent application Ser. No. 08/962,031, filed Oct. 31, 1997, entitled "Ink Delivery System for High Speed Printing;" U.S. patent application, Ser. No. 08/608,376, filed Feb. 28, 1996, entitled "Reliable High Performance Drop Generator For An Inkjet Printhead;" U.S. patent application Ser. No. 09/071,138, filed Apr. 30, 1998, entitled "Energy Control Method for an Inkjet Print Cartridge;" U.S. patent application Ser. No. 08/958,951, filed Oct. 28, 1997, entitled "Thermal Ink Jet Print Head and Printer Energy Control Apparatus and Method;" and U.S. Pat. No. 5,648,805, entitled "Inkjet Printhead Architecture for High Speed and High Resolution Printing;" The foregoing commonly assigned patent applications are herein incorporated by reference.

Figure 3:
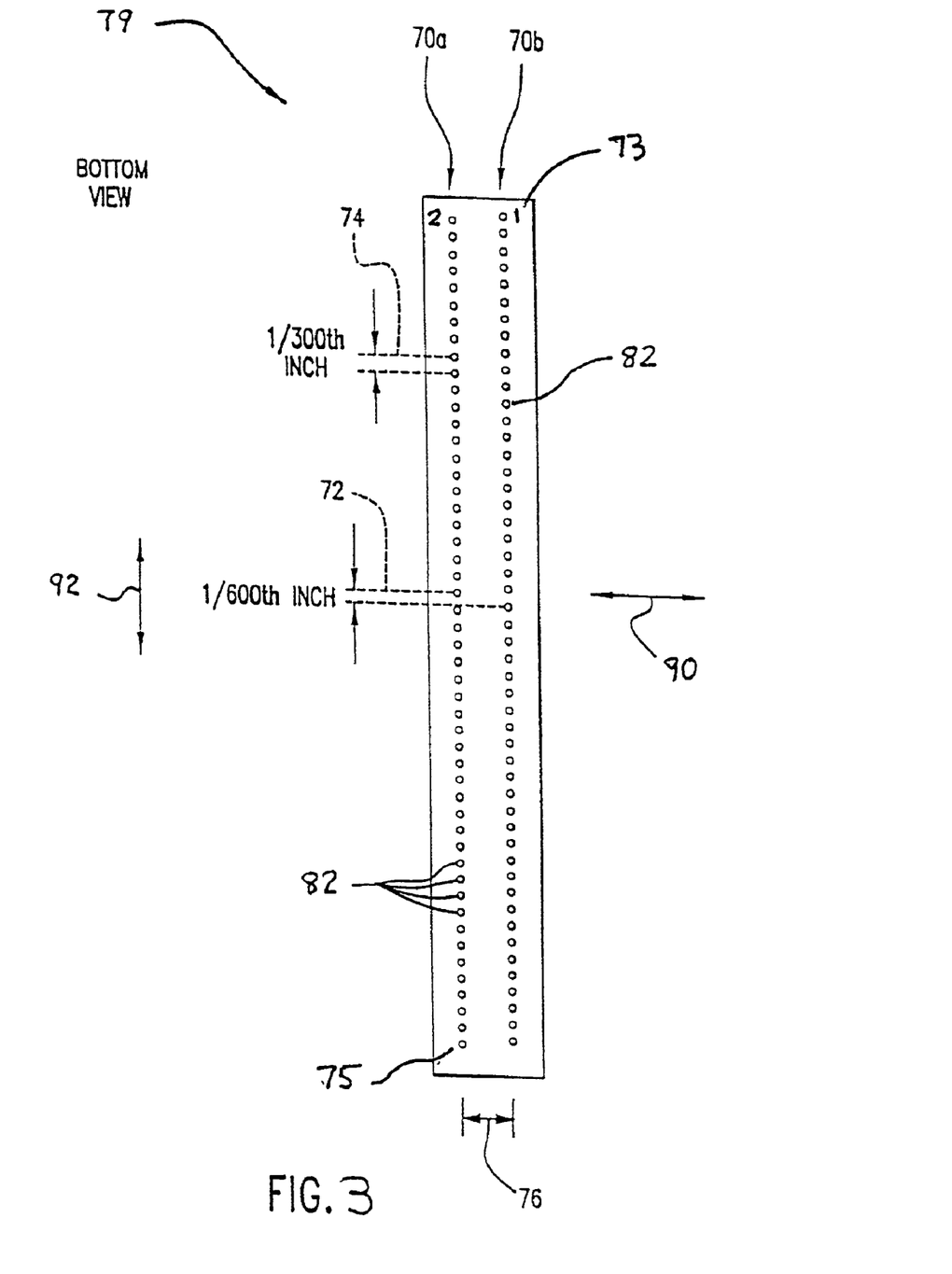
FIG. 3 is a schematic diagram of the nozzle arrangement of the printhead of FIG. 2.

Referring to FIG. 3, a preferred embodiment of a printhead 79 has two vertical columns 70a–b of nozzles which, when the printhead 79 is installed in the printer 10, are perpendicular to the scan or transverse direction 90. The columnar vertical spacing 74 between adjacent nozzles in a column is typically 1/300th inch in present-day printheads. However, by using two columns instead of one and logically treating the nozzles as a single column, the effective vertical spacing 72 between logical nozzles is reduced to 1/600th inch, thus achieving improved printing resolution in the direction of the media advance direction 92. As an illustration, the print controller 32 would print a vertical column of 1/600th inch pixel locations on the print medium 18 by depositing ink from column 70a, then moving the printhead 79 in the scan direction 90 the inter-column distance 76 before depositing ink from column 70b.

For purposes of clarity, the nozzles 82 are conventionally assigned a number starting at the top right 73 as the printhead assembly as viewed from the bottom of the printhead assembly 79 and ending in the lower left 75, thereby resulting in the odd numbered nozzles being arranged in one column 70b and even numbered nozzles being arranged in the other column 70a. Of course, other numbering conventions may be followed, but the description of the firing order of the nozzles 82 and ink ejection elements associated with this numbering system has advantages. One such advantage is that a row number is printed by the nozzle having the same nozzle number as the row number.

As an illustration, the print controller 32 would print a vertical column of 1/600th inch pixel locations on the print medium 14 by depositing ink from one column 70a or 70b of the nozzle array, then move the printhead 79 in the scan direction 90 the inter-column distance 76 before depositing ink from the other column.

Figure 4:
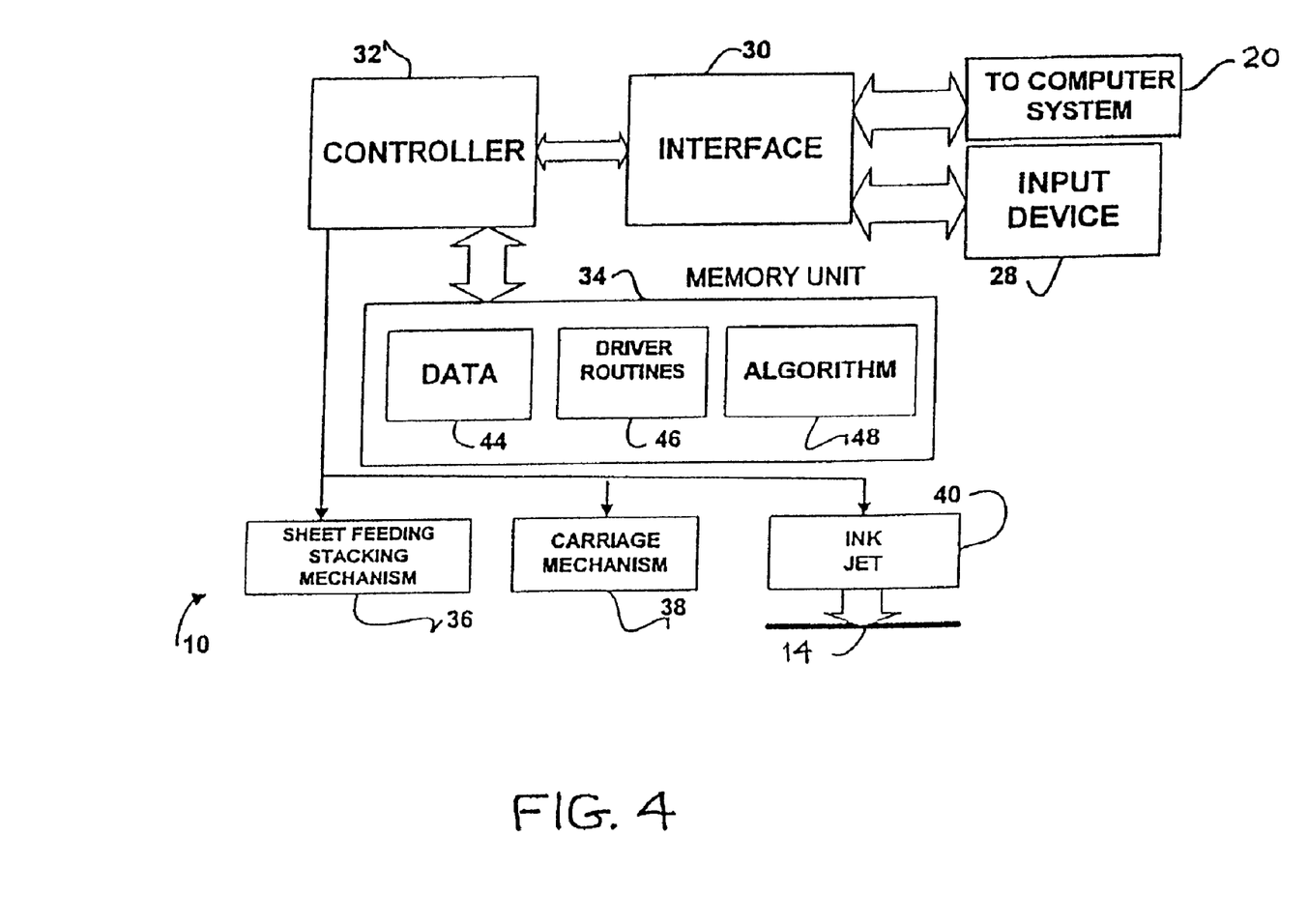
FIG. 4 is a block diagram of the hardware components of the inkjet printer of FIG. 1.

Considering now the printer 10 in greater detail with reference to FIGS. 1 and 4, the printer 10 generally includes a controller 32 that is coupled to a computer system 20 via an interface unit 30. The interface unit 30 facilitates the transferring of data and command signals to the controller 32 for printing purposes. The interface unit 30 also enables the printer 10 to be coupled electrically to an input device 28 for the purpose of downloading print image information to be printed on a print medium 14. Input device 28 can be any type peripheral device that can be coupled directly to the printer 10.

In order to store the data, the printer 10 further includes a memory unit 34. The memory unit 34 is divided into a plurality of storage areas that facilitate printer operations. The storage areas include a data storage area 44; a storage area for driver routines 46; and a control storage area 48 that holds the algorithms that facilitate the mechanical control implementation of the various mechanical mechanisms of the printer 10.

The data storage area 44 receives the data profile files that define the individual pixel values that are to be printed to form a desired object or textual image on the medium 14. The storage area 46 contains printer driver routines. The control storage area 48 contains the routines that control 1) a sheet feeding stacking mechanism for moving a medium through the printer from a supply or feed tray 12A to an output tray 12B; and 2) a carriage mechanism that causes a printhead carriage unit 16 to be moved across a print medium on a guide rod 22. In operation, the high speed inkjet printer 10 responds to commands by printing full color or black print images on the print medium which is mechanically retrieved from the feed tray 12A.

The specific partial-inking pattern employed in each pass, and the way in which these different patterns add up to a single fully inked image, is known as a "printmode." Printmodes allow a trade-off between speed and image quality. For example, a printer's draft mode provides the user with readable text as quickly as possible. Presentation, also known as best mode, is slow but produces the highest image quality. Normal mode is a compromise between draft and presentation modes. Printmodes allow the user to choose between these trade-offs. It also allows the printer to control several factors during printing that influence image quality, including: 1) the amount of ink placed on the media per dot location, 2) the speed with which the ink is placed, and, 3) the number of passes required to complete the image. Providing different printmodes to allow placing ink drops in multiple swaths can help with hiding nozzle defects. Different printmodes are also employed depending on the media type.

One-pass mode operation is used for increased throughput on plain paper. In a one-pass mode, all dots to be fired on a given row of dots are placed on the medium in one swath of the printhead, and then the print medium is advanced into position for the next swath. A two-pass printmode is a print pattern wherein one-half of the dots available for a given row of available dots per swath are printed on each pass of the printhead, so two passes are needed to complete the printing for a given row. Similarly, a four-pass mode is a print pattern wherein one fourth of the dots for a given row are printed on each pass of the printhead. In a printmode of a certain number of passes, each pass should print, of all the ink drops to be printed, a fraction equal roughly to the reciprocal of the number of passes.

A printmode usually encompasses a description of a "printmask," or several printmasks, used in a repeated sequence and the number of passes required to reach "full density," and also the number of drops per pixel defining what is meant by full density. The pattern used in printing each nozzle section is known as "printmask." A printmask is a binary pattern that determines exactly which ink drops are printed in a given pass or, to put the same thing in another way, which passes are used to print each pixel. In addition, the printmask determines which nozzle will be used to print each pixel location. Thus, the printmask defines both the pass and the nozzle which will be used to print each pixel location, i.e., each row number and column number on the media. The printmask can be used to "mix up" the nozzles used, as between passes, in such a way as to reduce undesirable visible printing artifacts.

The printer 10 operates in a multi-pass print mode to cause one or more swaths of ink droplets to be ejected onto the printing medium to form a desired image. Each swath is formed in a pattern of individual dots that are deposited at particular pixel locations in an N by M array defined for the printing medium. The pixel locations are conveniently visualized as being small ink droplet receiving areas grouped in a matrix array.

A print controller 32 controls the carriage 16 and media 14 movements and activates the nozzles 82 for ink drop deposition. By combining the relative movement of the carriage 16 along the scan direction 90 with the relative movement of the print medium 14 along the medium advance direction 92, each printhead 79 can deposit one or more drops of ink at each individual one of the pixel locations on the print medium 14. A printmask is used by the print controller 32 to govern the deposition of ink drops from the printhead 79. Typically a separate printmask exists for each discrete intensity level of color (e.g. light to dark) supported by the printer 10. For each pixel position in a row during an individual printing pass, the printmask has a mask pattern which both (a) acts to enable the nozzle positioned adjacent the row to print, or disable that nozzle from printing, on that pixel location, and (b) defines the number of drops to be deposited from enabled nozzles. Whether or not the pixel will actually be printed on by the corresponding enabled nozzle depends on whether the image data to be printed requires a pixel of that ink color in that pixel location. The printmask is typically implemented in firmware in the printer 10, although it can be alternatively implemented in a software driver in a computing processor (not shown) external to the printer.

The term "printing pass", as used herein, refers to those passes in which the printhead is enabled for printing as the nozzle arrangement moves relative to the medium 14 in the scan direction 90; in a bidirectional printer, each forward and rearward pass along the scan direction 90 can be a printing pass, while in a unidirectional printer printing passes can occur in only one of the directions of movement. In a given pass of the carriage 16 over the print medium 14 in a multi-pass printer 10, only certain pixel locations enabled by the printmask can be printed, and the printer 10 deposits the number of drops specified by the printmask for the corresponding pixel locations if the image data so requires. The printmask pattern is such that additional drops for the certain pixel locations, as well as drops for other pixel locations in the swath, are filled in during other printing passes.

Figure 5:
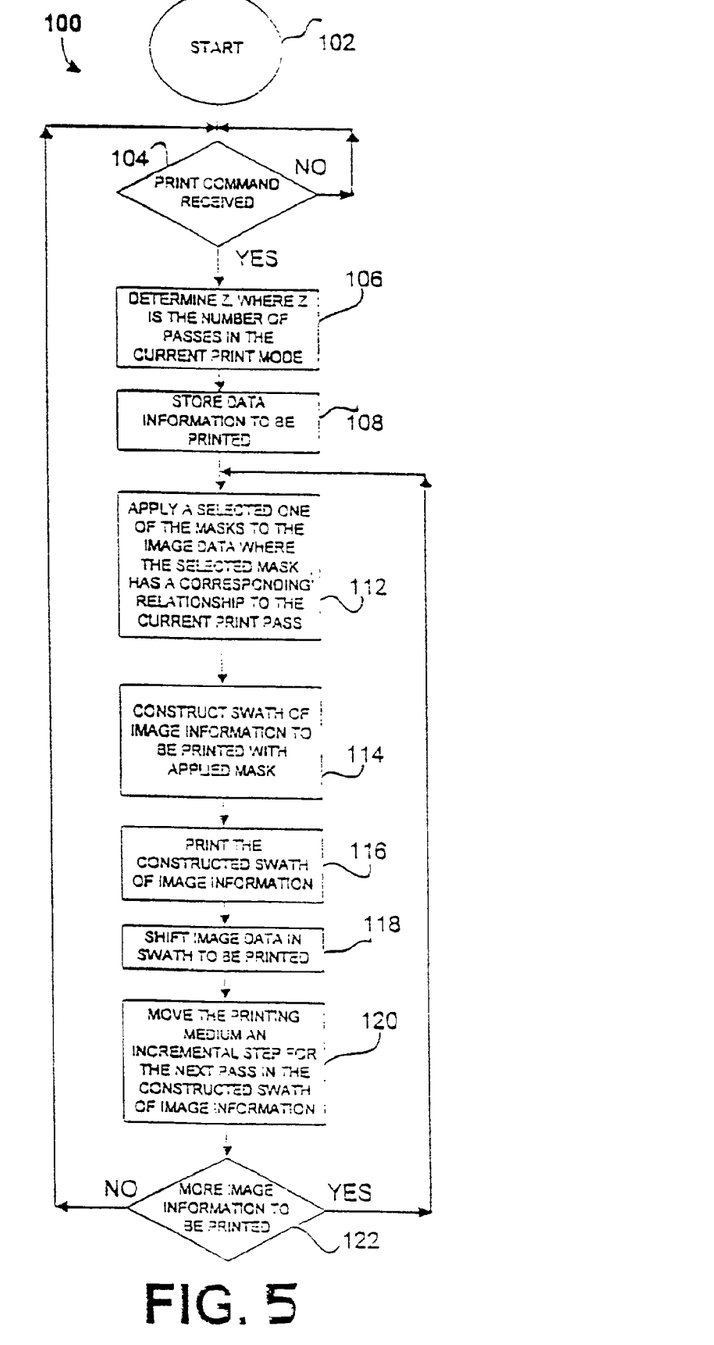
FIG. 5 is a flow chart showing the general steps performed by the printer controller in applying a printmask.

Referring to FIGS. 4 and 5, the control algorithm 100 is stored in the memory unit 34 and applied by the controller 32 to the image information to be printed. The number of printmasks that are applied via the algorithm 100, to any given area of image data is dependent upon the number of passes employed in a multi-pass print mode. For example, in a two-pass print mode, two printmasks are required. In a four-pass print mode, four printmasks are required. It should be understood that the same printmasks may be utilized for all color planes, or different generated printmasks for each color plane. The number of passes, Z, for printing an image is between about 2 passes and about 16 passes. A more preferred value for Z is between about 3 and about 8, while the most preferred value for Z is about 4.

Control algorithm program 100 begins at a start command 102 when power is applied to the controller 32. The program then proceeds to a decision command 104 to wait for a print command from the computer system 20. In this regard, if no print command is received, the controller 32 loops at the decision step 104 until the print command is received.

After determining the number of passes in the current print mode, the program proceeds to a command step 108 that causes the controller 32 to store in the memory unit data area 44, the information to be printed.

Considering again the control program 100, after step 112 has been performed, the program advances to a command step 114 that causes the swath to be constructed. Next, the program proceeds to a command step 116 that causes swath of image information to be printed.

After the swath of image information has been printed, the program then goes to a command step 118 that causes the image data to be shifted in anticipation of printing that portion of image information to be printed during the next pass of the printing operation.

The program then advances to a command step 120 that causes the printing medium 14 to be advanced incrementally in preparation of printing the next portion of image information.

The program then proceeds to a determination step 122 to determine whether additional image information is to be printed. If additional image information is to be printed the program go to the command step 112 and proceeds as described previously. If no additional image information is to be printed the programs advances to the determination step 104 and waits for the next print command to be received.

It should be understood by those skilled in the art that a different printmask is applied each time the program executes the command step 112. Although a different printmask is applied in each pass, it should be understood by those skilled in the art, that the same printmask is applied for each same numbered pass in each swath to be printed. Thus for example, in a four-pass print mode, printmask number one is applied to the first pass of each four pass sequence, while printmask number four is applied to the last pass in each four pass sequence. In this manner, the same printmasks are uniformly applied on a swath by swath basis to the image information to be printed. The total number of printmasks that are applied in the formation of the desired image to be printed is determined by the total number of passes that will be made to form the image. There is no intention therefore to limit the scope of the number of printmasks applied to any fixed number.

When printing in a one-pass printmode the ability to hide a malfunctioning ink ejection element out with a different ink ejection element is not possible because all pixels in a row are always printed with the same ink ejection element. If this ink ejection element is malfunctioning there is no way to hide print quality defects caused by the malfunctioning ink ejection element with prior error hiding techniques that depend on multiple passes. Malfunctioning ink ejection elements can be an ink ejection element which is either not firing or is firing with misdirection, small drop volume or some other problem.

An optical detection system can detect the presence of malfunctioning ink ejection elements. Optical drop detect circuits can be utilized in ink jet printers for various purposes including testing of the operation of ink ejection elements of a printhead. Optical drop detect circuits typically include a light sensor such as a photo diode which senses the light provided by a light source such as an LED. When a drop is present in the light path between the light sensor and the light source, the output of the light sensor changes since the amount of light sensed by the light sensor is reduced by the presence of the ink drop. The output of the light sensor is typically amplified and analyzed to determine whether an ink drop passed through the light path between the light source and the light sensor. Alternatively, an optical detection system can determine the presence of a drop on the media. Also, an acoustical drop ejection detection method can be used to identify malfunctioning ink ejection elements.

To get sufficient color intensity, depending on drop size a particular a particular number of drops are required to be placed in a pixel. In accordance with the present invention it is possible to hide print quality defects caused by a malfunctioning ink ejection element by increasing the amount of ink deposited by adjacent ink ejection elements to the ink ejection element that is malfunctioning. The ink deposited by adjacent ink ejection elements is increased to compensate for the amount of ink that should be deposited by the ink ejection element that is malfunctioning. This is accomplished by varying the ink deposited by the ink ejection element above and the ink ejection element below the malfunctioning ink ejection element. Thus, as shown in the example below, if ink ejection element 267 is malfunctioning, increase the ink deposited by ink ejection element 266 above and ink ejection element 268 below. Additional considerations are (1) increase the ink deposited into empty pixels before adding additional ink to pixels with ink and (2) if the maximum ink level for a pixel has been reached do not increase the amount of ink deposited. In the following example it is assumed that the maximum ink level for a pixel is two drops.

For example, if the desired pixel pattern of drops for ink ejection elements 266, 267 and 268 is:

| 266 | 1 | 2 | 0 | 0 | 1 | 1 | 2 | 2 | 1 | 2 |
| 267 | 1 | 1 | 1 | 2 | 2 | 1 | 0 | 0 | 1 | 1 |
| 268 | 2 | 0 | 1 | 0 | 1 | 2 | 1 | 0 | 2 | 2 |

In accordance with one embodiment of the present invention, if ink ejection element 267 is malfunctioning, increase the ink deposited by ink ejection element 266 above and ink ejection element 268 below the malfunctioning ink ejection element 267 so the ink drop pattern is as follows:

| 266 | 2 | 2 | 1 | 1 | 2 | 2 | 2 | 2 | 2 | 2 |
| 267 | 1 | 1 | 1 | 2 | 2 | 1 | 0 | 0 | 1 | 1 |
| 268 | 2 | 1 | 1 | 1 | 2 | 2 | 1 | 0 | 2 | 2 | where the pixels that have been increased are shown in boldface type.

Figure 6:
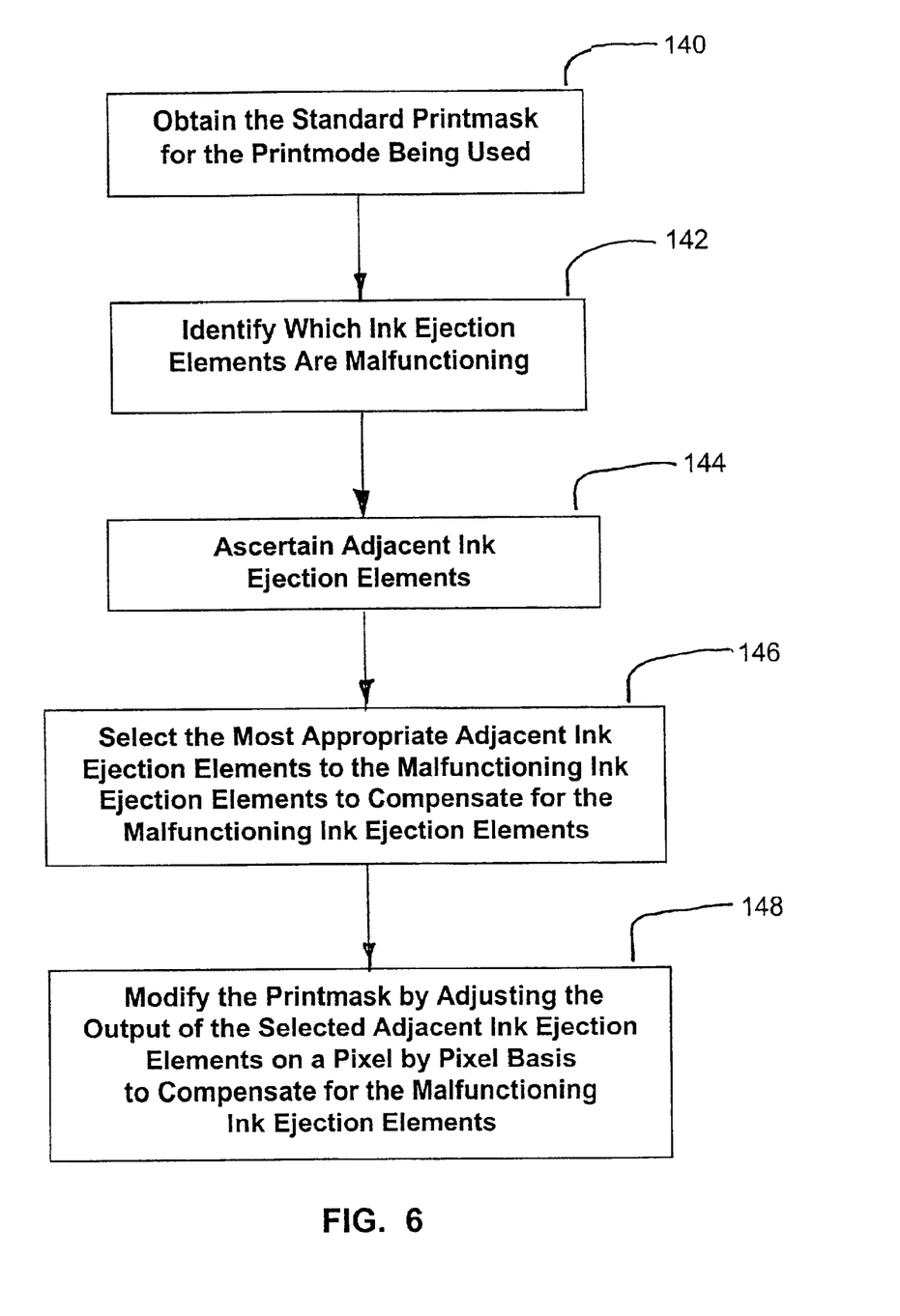
FIG. 6 is a flowchart showing the method of the present invention.

Referring to FIG. 6, in step 140, obtain the standard printmask for the printmode being used from either the printer driver, the printer's microprocessor control system, a lookup table in the printer's memory, or any other available source. In step 142, identify which ink ejection elements are malfunctioning. In step 144, for each of the malfunctioning ink ejection elements, ascertain the potential replacement ink ejection elements from the standard printmask obtained in step 140. In step 146, select the most appropriate adjacent ink ejection elements to the malfunctioning ink ejection elements to compensate for the malfunctioning ink ejection elements. In step 148, modify the printmask by adjusting the output of the selected adjacent ink ejection elements to compensate for the malfunctioning ink ejection elements. The foregoing steps of the present invention may be performed for the entire printmask at one time or performed individually for each pass.

Thus, the present invention allows the printer to continue printing in single-pass print mode even though there are malfunctioning ink ejection elements such that throughput is maintained while print quality remains high.

The present invention solves the problem of malfunctioning ink ejection elements by developing specific correction schemes that compensate for the malfunctioning ink ejection elements by selectively changing printing operations. This increases text, line and graphics quality by reducing the defects caused by the malfunctioning ink ejection elements. An advantage of this invention is that it allows dramatically improved image and text quality in a one-pass printmode. While the above is discussed in terms of specific and alternative embodiments, the invention is not intended to be so limited.

From the foregoing it will be appreciated that the method provided by the present invention represents a significant advance in the art. Although specific embodiments of the invention have been described and illustrated, the invention is not to be so limited. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method of correcting for malfunctioning ink ejection elements in a printing system using a single pass over a recording medium, comprising:
   obtaining a standard printmask;
   identifying ink ejection elements which are malfunctioning;
   ascertaining ink ejection elements adjacent to the ejection elements which are malfunctioning;
   selecting particular adjacent ink ejection elements from the adjacent ink ejection elements; and
   modifying the standard printmask by adjusting the amount of ink deposited by the selected adjacent ink ejection elements to create a modified printmask.

2. The method of claim 1 wherein said obtaining includes obtaining data specifying a pixel grid of rows and columns.

3. The method of claim 1 wherein said obtaining includes obtaining data specifying the ink ejection element used to print a particular pixel location.

4. The method of claim 1 wherein said obtaining includes obtaining the printmask from a printer driver.

5. The method of claim 1 wherein said obtaining includes obtaining the printmask from a printer memory.

6. The method of claim 1 wherein said identifying includes using an acoustical drop ejection detection to identify malfunctioning ink ejection elements.

7. The method of claim 1 wherein said identifying includes using an optical drop ejection detect to identify malfunctioning ink ejection elements.

8. The method of claim 7 wherein the optical drop detect includes passing a light beam from a light source to a light sensor through the path of ink droplets from the ink ejection chambers to the recording medium.

9. The method of claim 7 wherein the optical drop detect includes passing a light beam from a light source to the medium which is reflected to a light sensor thereby determining if a ink droplet has been deposited on the recording medium.

10. The method of claim 1 wherein said ascertaining the adjacent ink ejection elements are determined from the standard printmask.

11. The method of claim 1 wherein in said ascertaining the adjacent ink ejection elements are determined using a look-up table.

12. The method of claim 1 wherein in said ascertaining the adjacent ink ejection elements are determined from a printer memory.

13. The method of claim 1 wherein said ascertaining the adjacent ink ejection elements are determined from a printer driver.

14. The method of claim 1 wherein said selecting includes selecting an adjacent ink ejection element in a row above the malfunctioning ink ejection element.

15. The method of claim 1 wherein said selecting includes selecting an adjacent ink ejection element in a row below the malfunctioning ink ejection element.

16. The method of claim 1 wherein said selecting includes selecting an adjacent ink ejection element in a row above and in a row below the malfunctioning ink ejection element.

17. The method of claim 1 wherein said modifying includes increasing the ink deposited by the selected adjacent ink ejection elements by the amount of ink that would be deposited by the ink ejection element that is malfunctioning.

18. The method of claim 1 wherein said modifying includes increasing the ink deposited by the selected adjacent ink ejection elements into empty pixels before depositing additional ink to pixels deposited with ink.

19. The method of claim 1 wherein said modifying includes not increasing the ink deposited by the selected adjacent ink ejection elements above a predetermined maximum ink level for a pixel.

20. The method of claim 1 further including ejecting ink drops onto the recording medium in a single pass over the recording medium in accordance with the modified printmask.

21. A method of correcting for malfunctioning ink ejection elements in a printing system using a single pass over a recording medium, comprising:

operating a printing system in single pass mode;

obtaining a standard printmask;

identifying ink ejection elements which are malfunctioning, wherein said identifying comprises using a drop ejection detector;

ascertaining ink ejection elements adjacent to the ejection elements which are malfunctioning;

selecting particular adjacent ink ejection elements from the adjacent ink ejection elements; and modifying the standard printmask by adjusting the amount of ink deposited by the selected adjacent ink ejection elements to create a modified printmask.

* * * * *